Patented Mar. 21, 1939

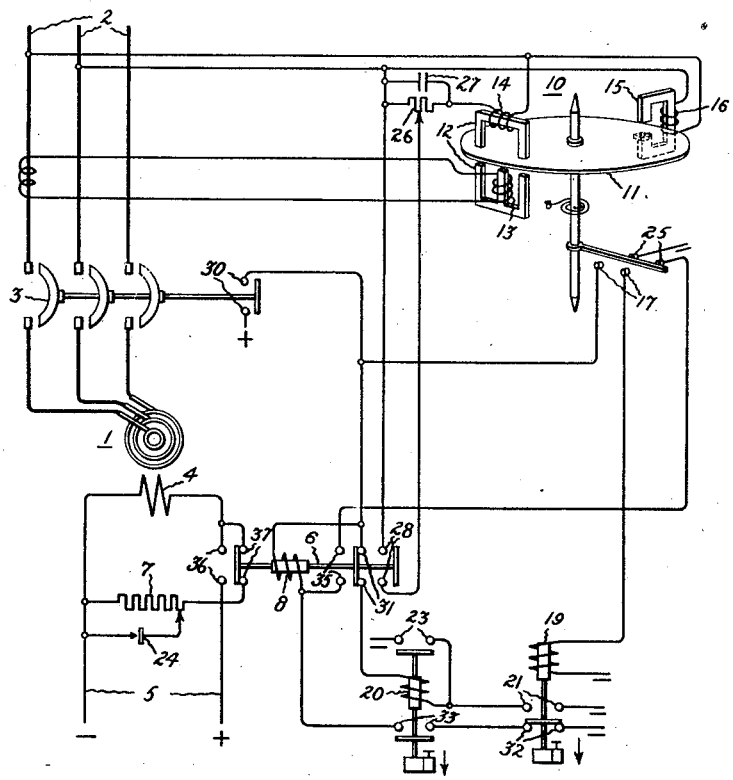

2,151,174

UNITED STATES PATENT OFFICE 2,151,174

CONTROL SYSTEM

Fred H. Winter, Schenectady, N. Y., assignor to General Electric Company, a corporation of New York Application December 1, 1937, Serial No. 177,496

8 Claims. (Cl. 172—289)

My invention relates to control systems, and particularly to systems for controlling the application and removal of the excitation of a synchronous machine.

One object of my invention is to provide an improved control system for effecting the application of excitation to the field winding of a synchronous machine at the proper time so that the machine can synchronize its maximum load.

Another object of my invention is to provide an improved control system for effecting the application of excitation to a synchronous machine in response to the pulsations produced in the armature current while the machine is operating at subsynchronous speeds so that the application of the excitation is made at a predetermined point in the slip cycle.

Another object of my invention is to provide an improved control arrangement whereby a single relay can effect the application of excitation to the field winding of a synchronous machine in response to a predetermined function of the armature current of the machine and the removal of excitation from the field winding in response to a different predetermined function of the armature current.

My invention will be better understood from the following description when taken in connection with the accompanying drawing, the single figure of which diagrammatically illustrates a synchronous motor control system embodying my invention, and the scope of my invention will be pointed out in the appended claims.

Referring to the drawing, I represents a synchronous motor having an armature winding which is arranged to be connected to a suitable polyphase supply circuit 2 by means of a switch 3 which may be of any suitable type, examples of which are well known in the art. While I have shown a manually controlled switch 3, it will be obvious to those skilled in the art that any suitable automatic means may be employed for controlling the opening and closing of this switch 3. The motor 1 is also provided with a field winding 4 which is arranged to be connected directly to a suitable source of excitation 5 by means of a field switch 6. This switch 6, when open, is arranged to connect suitable impedance means, such as a discharge resistor 7, across the terminals of the field winding 4. The switch 6 is provided with an operating winding 8 which, when energized, moves the switch 6 from the position in which it is shown to its other position in which the source of excitation 5 is connected directly to the field winding 4.

For effecting the closing of the field switch 6 when the motor 1 reaches the speed at which it is desired to synchronize the motor, I provide a relay 10 which responds to a predetermined function of the magnitude of the motor armature current. As shown in the drawing, this relay 10 is of the type disclosed in the copending application of Harold T. Seeley, Serial No. 153,953, filed July 16, 1937, and assigned to the same assignee as this application. This relay 10 has a rotatable member 11 and a wattmetric driving element 12 that includes a current winding 13 energized in response to the current in one of the polyphase conductors supplying current to the armature winding of the motor 1 and a voltage winding 14 connected across one of the phases of the supply circuit 2. The driving element 12 exerts in one direction on the movable element 11 a torque proportional to EI sin $(\theta - \phi)$ where E represents the supply circuit voltage applied to the circuit of the voltage winding 14, I represents the current in the supply circuit conductor to which the current winding 13 is connected, $\theta$ represents the phase angle by which I lags behind E and $\phi$ represents the angle by which the current in the voltage winding 14 lags behind the voltage E. The relay 10 is also provided with another driving element 15 which has a voltage winding 16 connected to one of the phases of the supply circuit 2. This driving element 15 is designed so as to exert a torque on the rotatable element 11 in a direction opposite to the torque exerted by the wattmetric device 12. As shown in the drawing, the voltage winding 16 is connected in parallel with the voltage winding 14 of the wattmetric device 12 so that the opposing torque exerted by the driving element 15 is proportional to $KE^2$, where K represents a constant.

When the torque of the wattmetric element 12 predominates, the movable element 11 is operated so as to effect the closing of the contacts 17 to complete an energizing circuit for a relay 19. This relay 19 is designed in any suitable manner so that it moves instantly to its energized position when the relay is energized but does not return to its deenergized position until after the winding of the relay has been deenergized for a predetermined length of time.

Associated with the relay 19 is another time relay 20, the energizing circuit for which is arranged to be completed through the contacts 21 of the relay 19 when it is in its energized position and the switch 3 is closed. The relay 20 is similar in construction to the time relay 19 so that it operates substantially instantaneously when its winding is energized but does not return to its deenergized position until a predetermined time interval after its winding is deenergized. Preferably the relays 19 and 20 are designed so that this time interval may be adjusted to any desired value.

When energized, the relay 20 closes its contacts 23 and thereby completes a locking circuit for itself around the contacts 21 of relay 19.

After the relay 20 is energized, the relays 19 and 20 remain energized until the motor speed reaches a value where the pulsations in the armature current are of such a character that the torque produced by the wattmetric element 12 causes the relay 10 to maintain its contacts 17 open for a sufficient length of time to allow the relay 19 to move to its deenergized position and complete an energizing circuit for the closing coil 8 of the field switch 6. The closing of the field switch 6 applies the field excitation to cause the motor to pull into synchronism.

Since the relay 19 does not operate to open its contacts 21 until the motor speed reaches such a value that a current pulsation of a proper magnitude and frequency occurs to cause the relay 10 to maintain its contacts 17 open for a predetermined time, it is evident that as the motor speed increases the operation of relay 19 occurs when the field magnet structure of the motor occupies a definite position relative to the rotating armature flux.

It is well known that when a salient pole synchronous machine is operating subsynchronously as an induction motor with its field winding unexcited a pulsation is produced in the armature current each time the armature magnetic poles pass the salient field poles and that these current pulsations have a frequency equal to twice the slip frequency. Since all of these pulsations are of substantially the same magnitude, it is evident that the relays 10 and 19 may effect the closing of the field switch 8 at either of two points in the slip cycle which are substantially 180° apart. One of these points, however, is a better point than the other at which to apply the field excitation, and in order to select this more desirable point, I provide, in accordance with my invention, an arrangement whereby the armature magnetic poles when passing the poles in one group of alternate salient field poles produce an armature current pulsation of one character and when passing the poles in the remaining group of alternate salient field poles produce an armature current pulsation of a different character so that the relay 10 can distinguish between these current pulsations. In the arrangement shown in the drawing, these armature current pulsations of different character are produced by connecting suitable unidirectional current conducting means such as a half wave rectifier 24 in parallel with a portion of the discharge resistor 7 so that the impedance of the field discharge circuit has a different value during the half cycle of slip when the induced field current is in a direction to flow through the half wave rectifier 24 than it does during the other half cycle of slip. This difference in the impedance of the field discharge circuit causes one of the pulsations in the armature current produced during each slip cycle to be of a sufficiently greater magnitude than the other so that the relay 10 can distinguish between them and only effect the operation of the relay 19 during one of them when the motor is operating at the desired speed from which the motor is to be pulled into step.

In order to remove excitation from the motor 1 when it falls out of synchronism, the energizing circuit of the operating winding 8 of the field switch 6 is completed through the normally closed contacts of the relay 10 during the normal synchronous operation of the motor. Therefore, when the motor pulls out of step and the relay 10 opens its contacts 25, the immediate opening of the field switch 6 is effected. Since it is usually desirable to have the relay 10 operate in response to a different function of the product of the armature voltage and current for field removal than for field application, I provide the parallel-connected resistor 26 and capacitor 27 in series with the winding 14 of relay 10 and the contacts 28 on the field switch 6 for short-circuiting a portion of the resistor 26 when the field switch 6 is closed. Therefore, it takes a different value of $EI \sin(\theta-\phi)$ to open the contacts 25 and close the contacts 17 to effect field removal than it does to effect field application.

The operation of the arrangement shown in the drawing is as follows:—When it is desired to start the motor 1, the switch 3 is closed so that the full voltage of the supply circuit 2 is applied to the armature winding of the motor 1 to cause the motor to start from rest as an induction motor. The motor armature current that flows as soon as the switch 3 is closed is of such a magnitude and phase that it causes the wattmetric element 12 of relay 10 to produce sufficient torque to close the contacts 17 and open the contacts 25. The closing of the contacts 17 completes, through the contacts 30 of the switch 3, an energizing circuit for the winding of relay 19. The relay 19 immediately moves to its energized position, and the closing of its contacts 21 completes an energizing circuit for the relay 20 through the contacts 30 of the switch 3 and contacts 31 of field switch 6. By closing its contacts 23, the relay 20 completes a holding circuit for its closing coil through contacts 31 of the field switch 6 and contacts 30 of the switch 3.

As long as the motor speed is below a predetermined value, the magnitude and the frequency of all of the pulsations of the motor armature current are such that the contacts 17 remain closed. When the motor speed increases above this predetermined value, the magnitude and phase of the motor armature current is such that during a portion of alternate pulsations of the armature current, the relay 10 maintains its contacts 17 open and its contacts 25 closed for a longer time than it does during the other pulsations. However, the relay 19, the circuit of which is open when the contacts 17 are open, does not move to its deenergized position until the motor speed has reached such a value that the frequency of these alternate armature current pulsations is such that the duration of each of them is just long enough to allow the relay 19 to drop out. The opening of the contacts 32 of the relay 19 completes an energizing circuit for the closing coil 8 of the field switch 6. This energizing circuit also includes the contacts 30 of the switch 3 and the contacts 33 of the relay 23. By closing its auxiliary contacts 35, the field switch 6 completes a locking circuit for its closing coil 8 through contacts 25 of relay 10 and contacts 30 of switch 3. By closing its main contacts 36, the field switch 6 connects the field winding 4 to the source of excitation 5 so that the field winding is supplied with direct current to cause the motor to pull into synchronism promptly. The opening of the contacts 37 of the field switch 6 disconnects the discharge resistor 7 and rectifier 24 from across the terminals of the field winding 4. By opening its contacts 31, the field switch 6 interrupts the holding circuit of the relay 20 which moves to its normal position after a predetermined time delay sufficiently long to permit the motor to pull into synchronism. By closing its contacts 28, the field switch completes a low impedance circuit around the capacitor 27 and resistor 26 so that the relay 10 responds to a different function of the motor armature current and voltage after the switch 6 is closed.

As long as the motor 1 remains in synchronism with the voltage of the supply circuit 4, the phase relation between the armature current and voltage and the magnitude of the armature current are such that relay 10 maintains its contacts 25 closed. When, however, the motor falls out of synchronism, the power factor of the motor becomes sufficiently lagging and the current becomes sufficiently great to cause the relay 10 to open its contacts 25 and close its contacts 17 so as to complete the heretofore described energizing circuit for the relay 19. The relay 19 immediately moves to its energized position. By opening its contacts 25, the relay 10 interrupts the holding circuit of the closing coil 8 of the field switch 6 so that the field winding 4 is immediately disconnected from the source of excitation 5, and the discharge resistor 7 and rectifier are reconnected across the terminals of the field winding 4. The energization of the relay 19 then effects, in the manner heretofore described, the energization of the relay 20. The motor continues to operate as an induction motor until it again reaches a speed sufficiently high to cause the relay 19 to move to its deenergized position and effect, in the manner heretofore described, the closing of the field switch 6 so as to connect the field winding 4 directly to the source of excitation 5.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:—

1. In combination, a synchronous machine having an armature winding and a field winding, an alternating current circuit, a source of excitation, and means for connecting said source to said field winding at a predetermined point in the slip cycle when said machine is operating subsynchronously including means for completing a relatively low impedance circuit for said field winding during a predetermined portion of each slip cycle and a relatively high impedance circuit for said field winding during a different predetermined portion of each slip cycle, and means selectively responsive to the different current pulsations respectively produced in the armature circuit of said machine as a result of said different impedance circuits for effecting the connection of said source to said field winding.

2. In combination, a synchronous machine having an armature winding and a field winding, an alternating current circuit, a source of excitation, and means for connecting said source to said field winding at a predetermined point in the slip cycle when said machine is operating subsynchronously including means for completing a relatively low impedance circuit for said field winding during that portion of each slip cycle when the induced field current is in a predetermined direction and a relatively high impedance circuit for said field winding during that portion of each slip cycle when the induced field current is in the opposite direction, and means dependent upon the different current pulsations respectively produced in the armature circuit of said machine as a result of said impedance circuits for effecting the connection of said source to said field winding.

3. In combination, a synchronous machine having an armature winding and a field winding, an alternating current circuit, a source of excitation, and means for connecting said source to said field winding at a predetermined point in the slip cycle when said machine is operating subsynchronously including means for completing a relatively low impedance circuit for said field winding during that portion of each slip cycle when the induced field current is in a predetermined direction and a relatively high impedance circuit for said field winding during that portion of each slip cycle when the induced field current is in the opposite direction, and means dependent upon the differences in the magnitudes of the current pulsations respectively produced in the armature circuit of said machine as a result of said different impedance circuits for effecting the connection of said source to said field winding.

4. In combination, a synchronous machine having an armature winding and a field winding, an alternating current circuit, a source of excitation, and means for connecting said source to said field winding at a predetermined point in the slip cycle when said machine is operating subsynchronously including unidirectional current conducting means connected in circuit with said field winding, and means dependent upon the differences in the magnitudes of alternate current pulsations produced in the armature circuit of said machine due to the presence of said unidirectional current conducting means in said field winding circuit for connecting said source to said field winding.

5. In combination, a synchronous machine having an armature winding and a field winding, an alternating current circuit, a source of excitation and means for connecting said source to said field winding at a predetermined point in the slip cycle when said machine is operating subsynchronously including unidirectional current conducting means connected in circuit with said field winding, and means selectively responsive to the difference in the alternate current pulsations produced in the armature circuit of said machine due to the presence of said unidirectional current conducting means in said field winding circuit for connecting said source to said field winding.

6. In combination, a synchronous machine having an armature winding and a field winding, an alternating current circuit, a source of excitation, and means for connecting said source to said field winding at a predetermined point in the slip cycle when said machine is operating subsynchronously including a discharge resistor connected across the terminal of said field winding, a half wave rectifier connected in parallel with a portion of said resistor, and means selectively responsive to the difference in the alternate current pulsations produced in the armature circuit of said machine due to the presence of said half wave rectifier in the field winding circuit for connecting said source to said field winding.

7. In combination, an alternating current supply circuit, a synchronous machine having an armature winding connected to said supply circuit, a field winding for said motor, a source of excitation, a switch for connecting said source of excitation to said field winding and means for effecting the opening and closing of said switch including a wattmetric relay having a voltage and current windings connected to said circuit, a resistor connected in series with said voltage winding, a capacitor connected in parallel with said resistor, and means responsive to the closing of said switch for completing a low impedance shunt circuit around said resistor.

8. In combination, an alternating current supply circuit, a synchronous machine having an armature winding connected to said supply circuit, a field winding for said motor, a source of excitation, a switch for connecting said source of excitation to said field winding and means for effecting the opening and closing of said switch including a wattmetric relay having a voltage and current windings connected to said circuit, a capacitor connected in series with said voltage winding, and means responsive to the closing of said switch for completing a relatively low resistance shunt circuit around said capacitor.

FRED H. WINTER.